(12) United States Patent
Shimazawa

(10) Patent No.: US 7,139,438 B2
(45) Date of Patent: Nov. 21, 2006

(54) IMAGE PROCESSING APPARATUS

(75) Inventor: Yohichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 669 days.

(21) Appl. No.: 10/251,429

(22) Filed: Sep. 20, 2002

(65) Prior Publication Data

US 2003/0099394 A1 May 29, 2003

(30) Foreign Application Priority Data

Sep. 21, 2001 (JP) ............................ P2001-288830

(51) Int. Cl.
G06K 9/20 (2006.01)
H04N 1/46 (2006.01)
(52) U.S. Cl. ........................... 382/282; 358/530
(58) Field of Classification Search ................. 382/103, 382/112, 135, 164, 165, 218, 282; 358/530; 348/169
See application file for complete search history.

(56) References Cited

U.S. PATENT DOCUMENTS

| | | | |
|---|---|---|---|
| 5,418,602 A * | 5/1995 | Nishikawa | 399/366 |
| 5,515,451 A | 5/1996 | Tsuji et al. | 382/135 |
| 5,629,990 A | 5/1997 | Tsuji et al. | 382/324 |
| 5,796,869 A | 8/1998 | Tsuji et al. | 382/203 |
| 5,828,777 A * | 10/1998 | Suzuki | 382/135 |
| 5,844,991 A * | 12/1998 | Hochberg et al. | 382/218 |
| 5,949,903 A * | 9/1999 | Outa et al. | 382/165 |
| 5,999,636 A | 12/1999 | Juang | 382/112 |
| 6,115,494 A * | 9/2000 | Sonoda et al. | 382/165 |

FOREIGN PATENT DOCUMENTS

| | | |
|---|---|---|
| EP | 0 708 411 A2 | 4/1996 |
| EP | 0 708 411 A3 | 5/1997 |
| EP | 0 800 123 A2 | 10/1997 |
| EP | 0 800 123 A3 | 11/1998 |
| EP | 0 917 113 A2 | 5/1999 |
| EP | 0 917 113 A3 | 2/2000 |
| EP | 1 096 433 A2 | 5/2001 |
| EP | 1 096 433 A3 | 12/2003 |
| FR | 2637144 | 3/1990 |
| JP | 5-85158 | 11/1993 |
| JP | 6-178098 | 6/1994 |

* cited by examiner

Primary Examiner—Kanjibhai Patel
(74) Attorney, Agent, or Firm—David G. Conlin; David A. Tucker; Edwards Angell Palmer & Dodge LLP

(57) ABSTRACT

An object of the invention is to provide an image processing apparatus capable of extracting a target image portion included in an image targeted for processing with high accuracy, by reducing a data amount required for extracting the target image portion. The image processing apparatus mounted in the image forming apparatus includes: pre-processing section for converting information for use in image formation into low-volume information for use in image extraction; an image judging section for judging whether or not a specific image part belonging to the target image portion is included in the image targeted for processing; and an image confirming section for checking, when the specific image part is judged to be included in the image targeted for processing, whether or not a potential target image portion including the specific image part is equal to the target image portion.

7 Claims, 7 Drawing Sheets

IMAGE PROCESSING APPARATUS

BACKGROUND OF THE INVENTION

1. Field of the Invention

The present invention relates to an image processing apparatus capable of extracting a to-be-extracted target image portion included in an image targeted for processing, which is designed to prevent certain documents, such as banknotes, valuable securities, and confidential documents, from being illicitly copied.

2. Description of the Related Art

With recent improvements in performance of color copiers, there has been an increasing demand for a copier capable of preventing illicit copy of certain documents, such as banknotes and valuable securities, for counterfeit purposes.

One conventionally-known copy preventive technique employed in copiers is as follows. Whether or not a read image is subjected to image formation is determined by making a comparison between image data obtained by reading an image to be recorded on a recording paper sheet, such as an original, using an image reading apparatus, and image data on a specific image subjected to copy prevention that is stored in advance in a copier. When it is judged that image formation is not performed, an ongoing image formation is discontinued, or an image different from that having being read is formed.

As such a conventional art, Japanese Unexamined Utility Model Publication JP-U 5-85158 (1993) discloses an image processing apparatus capable of detecting a certain circular image such as a red seal printed in a banknote. This image processing apparatus functions as follows. Firstly, a red pixel included in a read image, as viewed in a main scanning direction, is detected, and the image composed of a plurality of red pixels is thinned out. Next, another red pixel located a predetermined distance away from said red pixel in the main scanning direction is detected. If it is assumed that the red pixel detected first and the red pixel detected subsequently are located at both ends of a line segment defining a diameter of a circle, the line segment is turned by a predetermined angle with respect to the central position of the circle in the main scanning direction. When the locations of the two pixels at both ends of the line segment fall in a predetermined range of pixel positions stored in a memory, the red pixels are judged to represent a circularly contoured image, namely, a red seal of a banknote.

As another conventional art, Japanese Unexamined Patent Publication JP-A 6-178098 (1994) discloses a similar image processing apparatus. This image processing apparatus functions as follows. Firstly, two pixels equivalent to both ends of a line segment defining a diameter of a circle in a main scanning direction are detected. Next, if it is detected that an image is present at an intersection of the circle and a line located a predetermined distance away from the center of the circle in a sub scanning direction, the assumption that the detected red image has a circular shape is judged to be correct. Moreover, in this image processing apparatus, the number of ON pixels falling in a predetermined space within the circle, namely, the number of red pixels, is counted, and it is judged whether or not the counted value is equivalent to the numerical value corresponding to specific image data stored in a memory. If equivalency is found, an image to be formed based on the detected pixels is judged to be a specific circular image, namely, a red seal of a banknote.

However, the above-described image processing apparatuses have the following disadvantages. In the former disclosed in JP-U 5-85158, a red seal of a banknote is identified by detecting a red circular image. This method is simple, but poses a problem that an image similar to a red circle of a banknote's red seal is inadvertently judged to be a banknote's red seal. This leads to poor judgment accuracy.

In the latter disclosed in JP-A 6-178098, the number of red pixels within a red circle image having being read is counted, and a comparison is made between the counted value and the numerical value corresponding to specific image data stored in a memory. This method provides excellent judgment accuracy, but requires a considerably large storage capacity of a memory for storing specific image data. This necessitates high-speed comparing means, resulting in a circuit configuration of the image processing apparatus being very complicated. Hence, the cost required for manufacturing the image processing apparatus is undesirably increased.

SUMMARY OF THE INVENTION

An object of the invention is to provide an image processing apparatus which is capable of extracting a target image portion included in an image targeted for processing with high accuracy, by reducing a data amount required for extracting the target image portion.

The invention provides an image processing apparatus for extracting a to-be-extracted target image portion included in an image targeted for processing, comprising:

judging means for judging whether or not a specific image part belonging to the target image portion is included in the image targeted for processing; and confirming means for checking, when the specific image part is judged to be included in the image targeted for processing, whether or not a potential target image portion including the specific image part is equal to the target image portion.

According to the invention, the judging means judges whether or not the specific image part belonging to the to-be-extracted target image portion is included in the image targeted for processing. In the judging means, the judgment on whether or not the target image portion can possibly be included in the image targeted for processing is made by judging whether or not the specific image part is included in the image targeted for processing. Therefore, as compared with the case of judging whether or not the target image portion is included in the image targeted for processing on the basis of the entire target image portion, the data to be handled can be reduced, and accordingly judgment on whether or not the target image portion is included in the image targeted for processing can be made speedily. Moreover, because of the fewness of the data to be handled, a circuit configuration required for performing such a judgment operation can be simplified, and also the capacity of the storage means for storing the data can be reduced.

The confirming means checks, when the specific image part is judged to be included in the image targeted for processing by the judging means, whether or not a potential target image portion including the specific image part is the target image portion. Hence, the image processing apparatus is capable of extracting the target image portion with high accuracy.

In the invention, it is preferable that the judging means judges whether or not the specific image part is included in the image targeted for processing by comparing the number of pixels of specific color within part of the image targeted for processing with the number of pixels of specific color within the specific image part.

According to the invention, the judging means judges whether or not the specific image part is included in the image targeted for processing by comparing the number of pixels of specific color within part of the image targeted for processing with the number of pixels of specific color within the specific image part. Therefore, as compared with the case of making judgment by comparing the arrangement status of the pixels of specific color within part of the image targeted for processing with the arrangement status of the pixels of specific color within the specific image part, the judgment operation can be conducted in a simple manner. This makes it possible to simplify the circuit configuration required for making judgment, and to achieve speedup in the judgment operation.

In the invention, it is preferable that the confirming means checks whether or not a potential target image portion is equal to the target image portion by, after the potential target image portion included in the image targeted for processing and the target image portion are respectively divided into a plurality of regions, comparing the number of pixels of specific color within each region of the potential target image portion with the number of pixels of specific color within each region of the target image portion.

According to the invention, the confirming means checks whether or not a potential target image portion is equal to the target image portion by, after the potential target image portion included in the image targeted for processing and the target image portion are respectively divided into a plurality of regions, comparing the number of pixels of specific color within each region of the potential target image portion with the number of pixels of specific color within each region of the target image portion. As compared with for example the case where whether or not the potential target image portion is equal to the target image portion is checked by comparing the number of pixels of specific color within the entire target image portion and that within the entire potential target image portion, and if the number of pixels of the target image portion and that of the potential target image portion are found to be substantially identical with each other, the potential target image portion is judged to be the target image portion, with the confirming means of the invention, it can possibly be prevented that, in spite of a fact that the potential target image portion actually differs from the target image portion, it is misjudged as the target image portion because of their specific-color pixel numbers being almost the same. As a result, the confirmation operation can be conducted with high accuracy.

In the invention, it is preferable that the target image portion is divided in such a way that the numbers of pixels of specific color within the divided regions are averaged.

According to the invention, the target image portion is divided in such a way that the numbers of pixels of specific color within the divided regions are averaged. This eliminates the need to store the number of pixels of specific color on a region-by-region basis. Thus, as compared with the case where the number of pixels is stored on a region-by-region basis, the storage capacity for storing the number of pixels for each region can be reduced.

In the invention, it is preferable that the judging means employs a template for representing the specific image part based on information on each pixel constituting a pixel group, the pixel group being obtained by arranging two or more pixel lines, each of which consists of an array of a plurality of pixels arranged in a predetermined first direction, in a second direction perpendicular to the first direction; and that the judging means judges whether or not the specific image part is included in the image targeted for processing by scanning the image targeted for processing using a judging window having a pixel group whose arrangement is substantially the same as in the template, followed by, after dividing each pixel line into a plurality of regions, comparing the number of pixels of specific color within each of the regions of the judging window with the number of pixels within each of the regions of the template.

According to the invention, the judging means employs a template for representing the specific image part based on information on each pixel constituting a pixel group, the pixel group being obtained by arranging two or more pixel lines, each of which is composed of an array of a plurality of pixels arranged in a predetermined first direction, in a second direction perpendicular to the first direction. Then, the judging means scans the image targeted for processing using a judging window having a pixel group whose arrangement is substantially the same as in the template. With this judging means, as compared with the case where judgment is made by scanning the image targeted for processing on a pixel-by-pixel basis, the judgment operation can be conducted with consideration given to the relationship between adjacent pixels. As a result, the judgment accuracy can be enhanced.

Moreover, after each pixel line is divided into a plurality of regions, whether or not the specific image part is included in the image targeted for processing is judged by comparing the number of pixels of specific color within each of the regions of the judging window with the number of pixels within each of the regions of the template. With such a judging means, as compared with the case where judgment is made by comparing the number of all the pixels of the pixel line in each of the regions of the judging window with that of the template, the amount of data required for judgment can be reduced. This allows the judging means to perform judgment speedily.

In the invention, it is preferable that the judging means judges that the specific image part is included in the image targeted for processing when the number of pixels of specific color within each divided region of the pixel line is found to fall within a predetermined range.

According to the invention, the judging means judges that the specific image part is included in the image targeted for processing when the number of pixels of specific color within each divided region of the pixel line is found to fall within a predetermined range. With the judging means, even if the target image portion sustains smearing or faintness and consequently the number of pixels of specific color within the specific image part of the target image portion differs from that observed in the target image portion free from smearing or faintness, it is possible to judge that the specific image part is included in the image targeted for processing with high accuracy. Moreover, by setting upper and lower limits on the number of pixels of specific color within each divided region of the pixel line, the judgment operation can be conduced speedily by the judging means.

In the invention, it is preferable that the image processing apparatus, which is mounted in an image forming apparatus, includes pre-processing means for converting information for use in image formation into low-volume information for use in image extraction.

According to the invention, the pre-processing means converts information for use in image formation into low-volume information for use in image extraction. This allows the judging means and the confirming means to speedily conduct judgment operation and confirmation operation, respectively, and also allows the image processing apparatus to extract a target image portion speedily.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
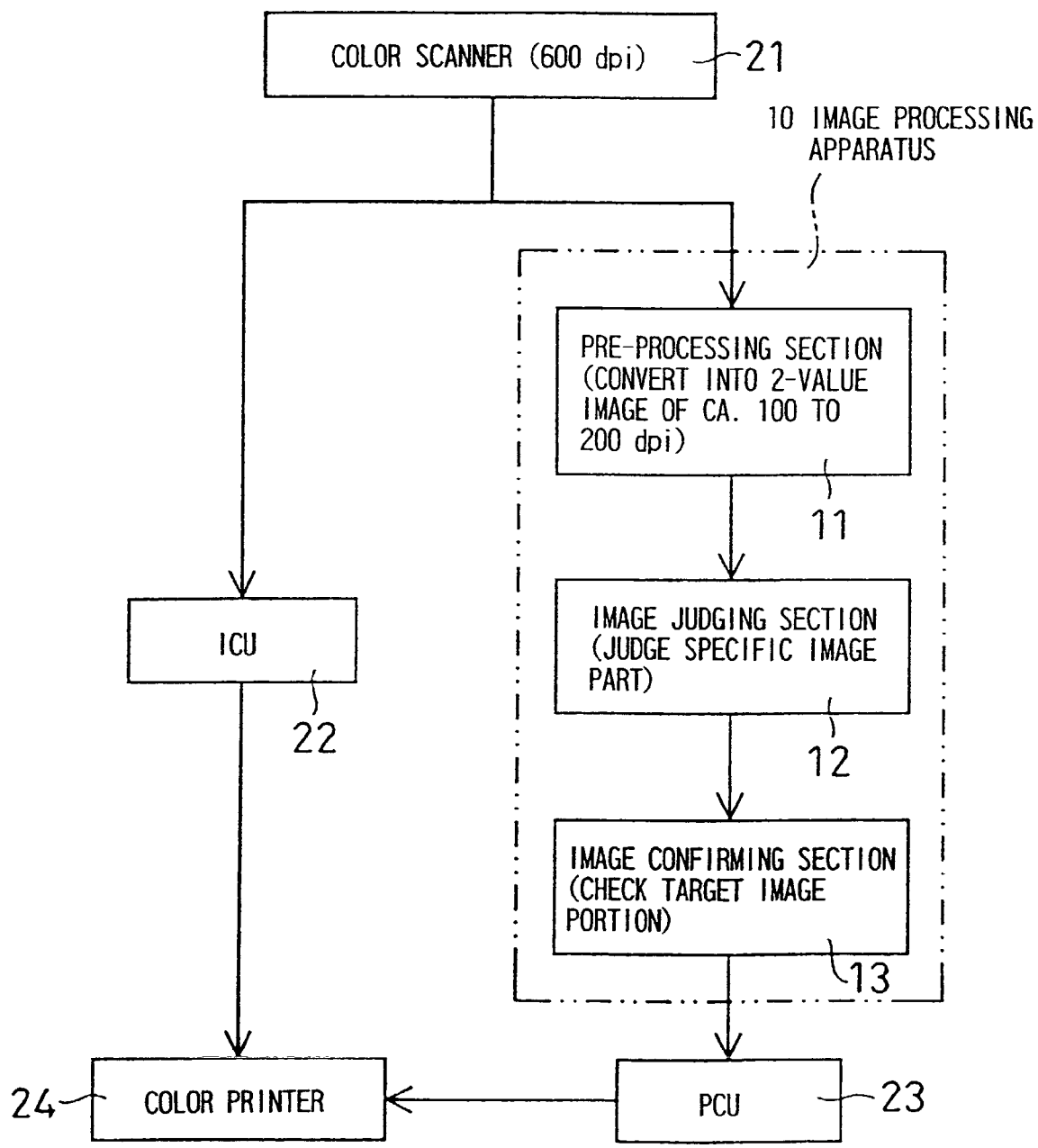
FIG. 1 is a block diagram showing a structure of an image forming apparatus incorporating an image processing apparatus according to one embodiment of the invention.

Now referring to the drawings, preferred embodiments of the invention are described below.

Figure 2:
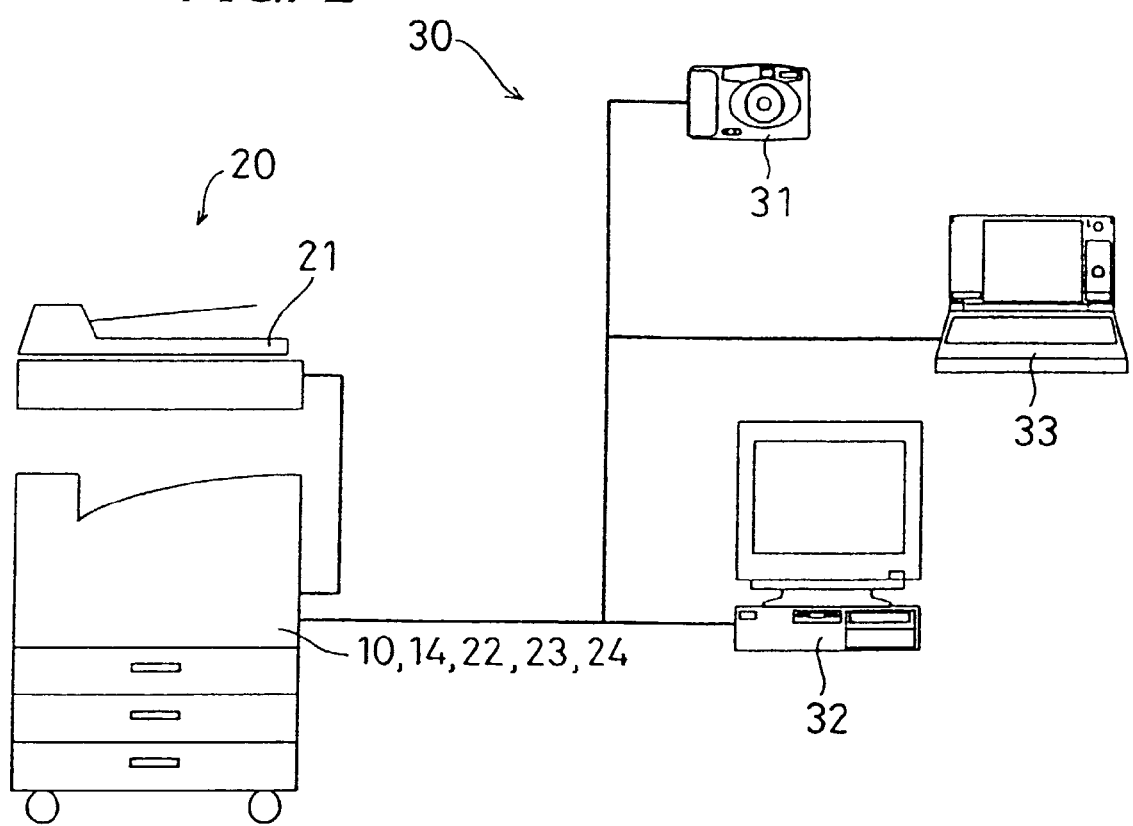
FIG. 2 is a schematic diagram showing a configuration of a network including the image forming apparatus.
Figure 3:
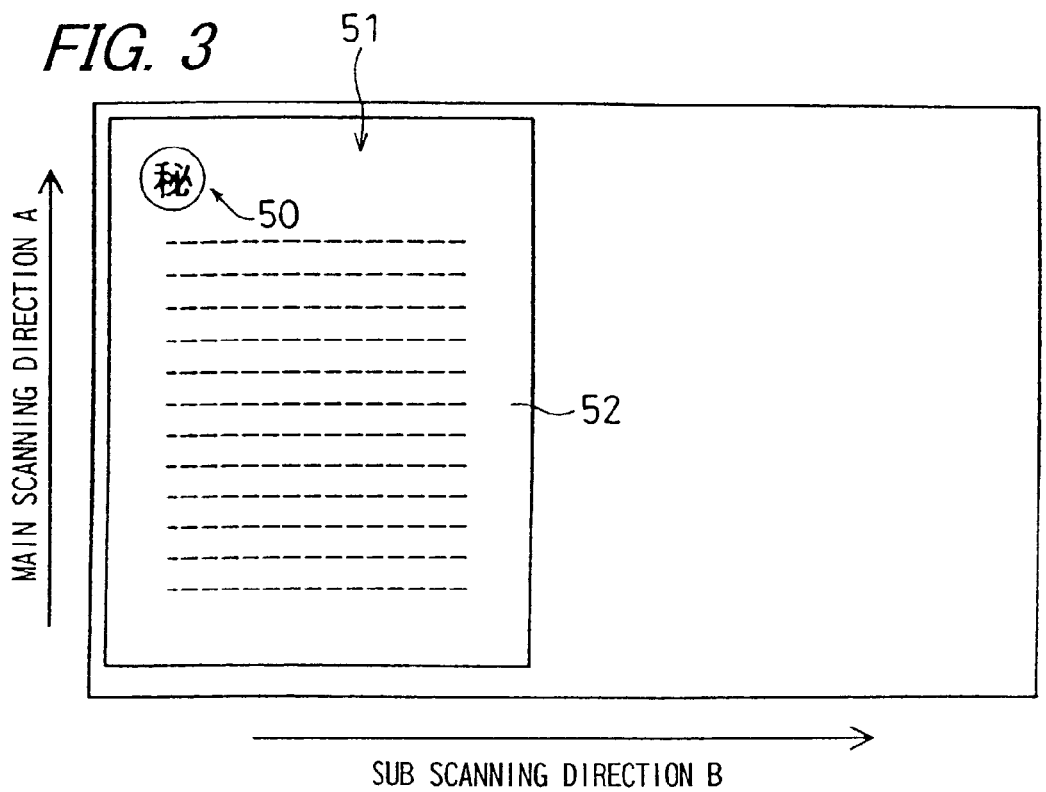
FIG. 3 is a plan view showing an original on which an image targeted for processing including a target image portion is recorded.

FIG. 1 a block diagram showing a structure of an image forming apparatus 20 incorporating an image processing apparatus 10 according to one embodiment of the invention. FIG. 2 is a schematic diagram showing a configuration of a network 30 including the image forming apparatus 20. FIG. 3 is a plan view showing an original 52 on which an image targeted for processing 51 including a target image portion 50 is recorded.

In the image forming apparatus 20, when the image processing apparatus 10 judges that the target image portion 50 is present in the image targeted for processing 51, which is an image read out by a color scanner 21; or an image taken by a digital camera 31; or an image obtained through a computer network, such as the Internet, and stored in a personal computer (hereafter abbreviated as "PC") 32 or a notebook-type personal computer (hereafter abbreviated as "note PC") 33, the image targeted for processing 51 is no longer subjected to image formation. This makes it possible to prevent banknotes or valuable securities from being counterfeited and prevent confidential documents from being illicitly copied.

The image forming apparatus 20 is composed of the image processing apparatus 10; the color scanner 21; a formed-image processing unit (hereafter referred to as "ICU") 22; a printer control unit (hereafter abbreviated as "PCU") 23; and a color printer 24.

The color scanner 21 acts as reading means for reading out an original 52 on which an image such as the image targeted for processing 51 is recorded. In the color scanner 21, the image targeted for processing 51 is read out and digitized as follows. Firstly, light is applied to the original 52. Then, the light reflected from the original 52 is converted into an electric signal while displacing a scanner head (not shown), which includes a plurality of photoelectric conversion elements ("CCD" for short) arranged in a main scanning direction A defined as a first direction, in a sub scanning direction B defined as a second direction that is perpendicular to the main scanning direction A. The read image targeted for processing 51 is fed to the image processing apparatus 10 and the ICU 22, as well as to the PC 32 and the note PC 33 connected through the network 30 to the image forming apparatus 20. The color scanner 21 is operated in the main and sub scanning directions A and B at an optical resolution of 600 dpi, and outputs a 256-step gradation for each three primary colors of RGB, with the total number of available colors being 16,777,216.

In the ICU 22, an image including the image targeted for processing 51, which has been fed from the color scanner 21, as well as the digital camera 31, PC 32, and note PC 33 connected through the network 30 to the image forming apparatus 20, is subjected to a predetermined treatment such as color correction so as to be suitably formed on a recording paper sheet by the color printer 24. The image having undergone such a treatment is fed to the color printer.

The image processing apparatus 10 is composed of a pre-processing section 11, an image judging section 12, an image confirming section 13, and a storage section 14. In the image processing apparatus 10, the to-be-extracted target image portion 50 included in the image targeted for processing 51 is extracted.

In the pre-processing section 11 acting as pre-processing means, the image targeted for processing 51, which has been fed from the color scanner 21, as well as the digital camera 31, PC 32, and note PC 33 connected through the network 30 to the image forming apparatus 20, is converted into for example such an image as to have a resolution in a range approximately from 100 to 200 dpi, and two gradation levels (e.g. white and black colors) on the basis of a predetermined threshold value. The image targeted for processing 51 thus converted is fed to the image judging section 12. In this way, the image targeted for processing 51, which is used for image formation performed in the color printer 24, is converted into a low-volume image information used for extracting the target image portion 50. This makes it possible to achieve speedup in the judgment process performed in the image judging section 12 and in the confirmation process performed in the image confirming section 13. Moreover, since the amount of information representing the image targeted for processing 51 is reduced, it is possible to reduce the capacity of the storage section 14 for storing the image targeted for processing 51 to extract the target image portion 50.

The image judging section 12, acting as judging means, judges whether or not a specific image part 53 constituting part of the target image portion 50 is included in the image targeted for processing 51. In the image confirming section 13 acting as confirming means, when the image judging section 12 judges that the specific image part 53 is included in the image targeted for processing 51, whether or not a potential target image portion including the specific image part 53 is equal to the target image portion 50 is checked. The storage section 14 stores the target image portion 50, the image targeted for processing 51 having been converted by the pre-processing section 11, the specific image part 53 constituting part of the target image portion 50, etc.

When the target image portion 50 is extracted from the image targeted for processing 51 in the image processing apparatus 10, the PCU 23 controls the color printer 24 in such a manner that the image targeted for processing 51 having undergone a predetermined treatment in the ICU is prevented from being formed on a recording paper sheet. Alternatively, the color printer 24 may be so controlled that the image targeted for processing 51 fed from the ICU 22 is reproduced with noise added thereto. On the other hand, when the target image portion 50 is not extracted from the image targeted for processing 51 in the image processing apparatus 10, the PCU 23 controls the color printer 24 in such a manner that the image targeted for processing 51 having undergone a predetermined treatment in the ICU is formed on a recording paper sheet.

The color printer 24 reproduces the image targeted for processing 51 fed from the ICU 22 on a recording paper sheet under the control of the PCU. The color printer 24 is realized by the use of for example image forming means for forming an image on a recording paper sheet by ejecting ink of plural colors from nozzles, such as an ink-jet type printer or an electrophotographic printer.

Figure 4A:
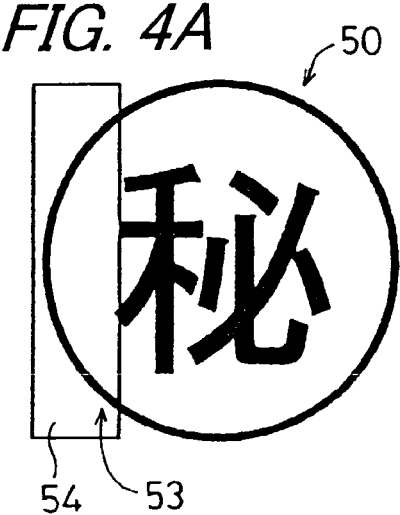
FIG. 4A is a plan view showing the target image portion and a template.
Figure 4B:
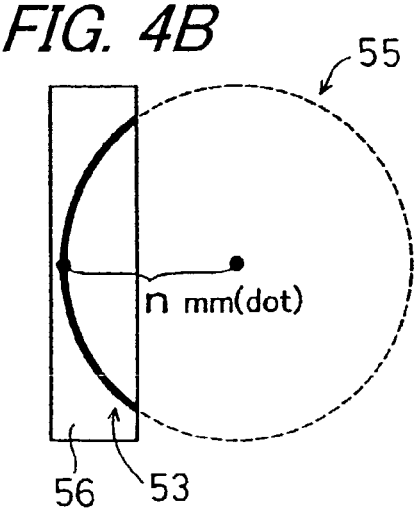
FIG. 4B is a plan view showing a potential target image portion and a judging window.
Figure 5A:
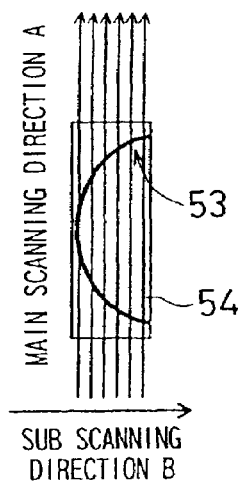
FIG. 5A is a plan view showing the template, a main scanning direction A, and a sub scanning direction B.
Figure 5B:
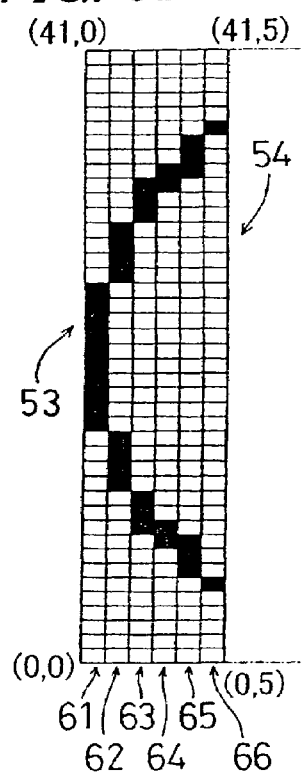
FIG. 5B is an enlarged plan view showing the template.
Figure 5C:
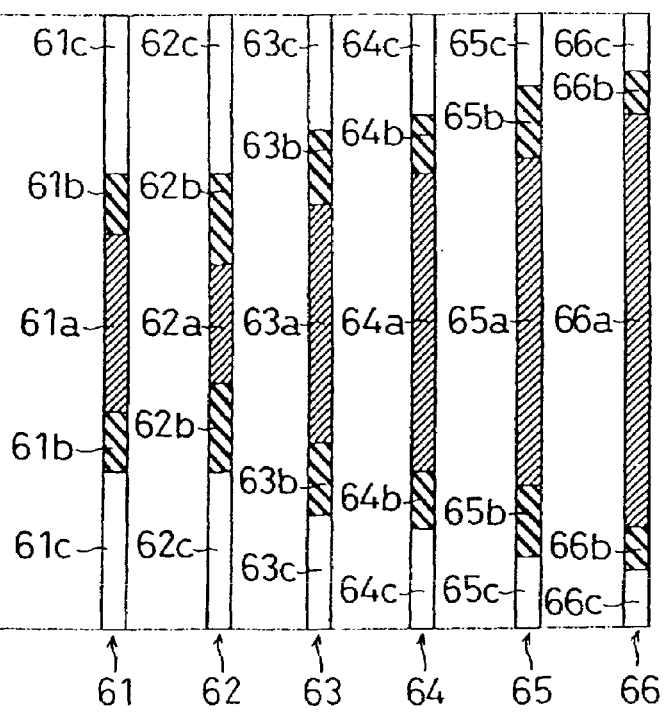
FIG. 5C is a plan view showing individual regions of each pixel line of the template.

FIG. 4A is a plan view showing the target image portion 50 and a template 54, and FIG. 4B is a plan view showing a potential target image portion 55 and a judging window 56. FIG. 5A is a plan view showing the template 54, the main scanning direction A, and the sub scanning direction B, and FIG. 5B is an enlarged plan view showing the template 54. FIG. 5C is a plan view showing individual regions constituting each pixel line of the template 54. The template 54, which has information on the specific image part 53 constituting part of the target image portion 50, is stored in the storage section 14, and is used for judging whether or not the specific image part 53 is included in the image targeted for processing 51.

The image judging section 12 judges whether or not the specific image part 53 constituting part of the target image portion 50 is included in the image targeted for processing 51. In a case where the image targeted for processing 51 is a banknote, the target image portion 50 is a specific image represented as a feature of the banknote. In this embodiment, the original 52 is a confidential document as shown in FIG. 3, and the target image portion 50 is a seal represented as a circled kanji character "秘".

The image targeted for processing 51 carried on the original 52, which has been read out by the color scanner 21, is converted by the pre-processing section 11 into such an image as to have a resolution of 200 dpi and two gradation levels, i.e. two colors of white and black, and is thereafter fed to the image judging section 12.

The specific image part 53 is the most distinctive part of the target image portion 50. In this embodiment, for example, the specific image part 53a is defined by a circular arc constituting part of a circumference of a circle representing the target image portion 50. Specifically, assuming that the circle representing the target image portion 50 has a radius of n [mm]. In this case, as shown in FIG. 4B, if the radius of curvature of the circular arc is n [mm], the circular arc is easily supposed to be part of the circle having a radius of n [mm]. Thus, where the specific image part 53 is defined by the circular arc constituting part of the target image portion 50, if the potential target image portion 55 includes such an circular arc, it is supposed to be a circle having a radius of n [mm]. Thereupon, it is judged that the potential target image portion 55 is possibly equal to the target image portion 50.

In the storage section 14 of the image processing apparatus 10, the template 54 for representing the specific image part 53 constituting part of the target image portion 50 is stored in advance. The template 54 has the same resolution and gradation level as those of the image targeted for processing 51 having been converted by the pre-processing section 11. The template 54 includes a pixel group obtained by arranging two or more pixel lines, in this embodiment, 6 pieces of pixel lines side by side in the sub scanning direction B. The pixel line consists of an array of a plurality of pixels, in this embodiment, 252 pieces of black and white pixels arranged in the main scanning direction A. On the basis of the information on each pixel included in the pixel group, the specific image part 53 is represented. The judging window 56 has a pixel group whose arrangement is substantially the same as in the template 54.

More specifically, as shown in FIG. 5B, the template 54 consists of a first pixel line 61; a second pixel line 62; a third pixel line 63; a fourth pixel line 64; a fifth pixel line 65; and a sixth pixel line 66. These pixel lines, each of which includes 42 pieces of pixels arranged in the main scanning direction A, are arranged side by side in the sub scanning direction B. Similarly, the judging window 56 consists of a first pixel line; a second pixel line; a third pixel line; a fourth pixel line; a fifth pixel line; and a sixth pixel line that correspond to the first to sixth pixel lines 61 to 66 of the template 54, respectively. Besides, as shown in FIG. 5C, the first to sixth pixel lines 61 to 66 of the template 54 are, in accordance with the arrangement status of their black pixels, each divided into several regions of three types including a plurality of pixels: a first region (61a to 66a); a second region (61b to 66b); and a third region (61c to 66c). The range of the number of black pixels to be included in the region is determined region by region.

In the first to third regions constituting each of the pixel lines 61 to 66, the range of black-pixel number is determined as follows. For example, in the first pixel line 61, the first region 61a lies on the circular arc defining the specific image part 53. In this region, since a larger number of black pixels are present than in other regions kept out of the circular arc, the number of black pixels is set in a wide range. Meanwhile, the third region 61c is located at a sufficient distance from the circular arc. In this region, the number of black pixels is set in a range close to zero. Further, the second region 61b is located in the vicinity of the circular arc. In this region, the number of black pixels is set in a range narrower than in the first region 61a. In this way, for each of the pixel lines 61 to 66 of the template 54, the range of black-pixel number for each of the first to third regions is determined and stored in the storage section 14. The setting results will be listed in Table 1 below.

TABLE 1

| | | Range of pixel number | | | |
|---|---|---|---|---|---|
| First pixel Line 61 | Second pixel Line 62 | Third pixel Line 63 | Fourth pixel Line 64 | Fifth pixel Line 65 | Sixth pixel Line 66 |
| First Region 61a | First Region 62a | First Region 63a | First Region 64a | First Region 65a | First Region 66a |
| $9 \leq$ black | black $\leq 1$ | black $\leq 1$ | black $\leq 1$ | black $\leq 1$ | black $\leq 1$ |
| Second Region 61b | Second Region 62b | Second Region 63b | Second Region 64b | Second Region 65b | Second Region 66b |
| black $\leq 2$ | $3 \leq$ black | $3 \leq$ black | $1 \leq$ black | $2 \leq$ black | $1 \leq$ black |
| Third Region 61c | Third Region 62c | Third Region 63c | Third Region 64c | Third Region 65c | Third Region 66c |
| black $\leq 1$ | black $\leq 1$ | black $\leq 1$ | black $\leq 1$ | black $\leq 1$ | black $\leq 1$ |

The image judging section 12 is operated as follows. Firstly, the image targeted for processing 51, which has been read out by the color scanner 21 and converted by the pre-processing section 11, is scanned pixel by pixel by the judging window 56 being moved in the main scanning direction A. Upon completion of the scanning in the main scanning direction A, the judging window 56 is moved in the sub scanning direction B on a pixel-by-pixel basis, and subsequently moved in the main scanning direction A once again. By repeating such a movement of the judging window 56 a given number of times, the entire image targeted for processing 51 is scanned. During this operation, comparison is made between the number of pixels of specific color within each region of the judging window 56 and that within each region of the template 54. According to the comparison results, whether or not the specific image part 53 is included in the image targeted for processing 51 is judged.

Specifically, in the image judging section 12, the first pixel line of the judging window 56 is divided into several regions: a first region; a second region; and a third region, basically in the same manner as in the corresponding first pixel line 54a of the template 54. Then, judgment is made on whether or not the black-pixel numbers of the first to third regions of the first pixel line of the judging window 56 respectively fall in the ranges of the corresponding black-pixel numbers of the first to third regions 61a to 61c of the first pixel line 61 of the template 54, as listed in Table 1.

In the image judging section 12, similarly, judgment is made on whether or not the black-pixel numbers of the first to third regions of each of the second to sixth pixel lines of the judging window 56 respectively fall in the ranges of the corresponding black-pixel of the first to third regions of each of the second to sixth pixel lines 62 to 66 of the template 54, as listed in Table 1. In this way, when the black-pixel numbers of the first to third regions of each of the first to sixth pixel lines of the judging window 56 respectively fall in the ranges of the corresponding black-pixel numbers listed in Table 1, the image judging section 12 judges that the specific image part 53 is included in the image targeted for processing 51.

As described hereinabove, the image judging section 12 judges that the specific image part 53 is included in the image targeted for processing 51 when the black-pixel numbers of each of the individual regions of each pixel line of the judging window 56 are each kept in a predetermined range. With such a judgment operation, even if the target image portion 50 sustains smearing, faintness, excessive boldness, deviation, or other defects and consequently the number of black pixels within the specific image part 53, as observed during scanning of the image targeted for processing 51 using the judging window 56, differs slightly from the number of pixels within the specific image part 53 of the target image portion 50 free from smearing, faintness, excessive boldness, or deviation, it is possible to judge whether or not the specific image part 53 is included in the image targeted for processing 51 with high accuracy.

In the image judging section 12, since upper and lower limits are set on the number of black pixels within each of the divided regions of the pixel line, speedup can be achieved in the judgment operation. Moreover, since the image targeted for processing 51 is scanned using the judging window 56, as compared with the case where the image targeted for processing 51 as a whole is scanned at one time, the number of pixels required for onetime judging operation can be reduced, whereby making it possible to achieve speedup in the judgment operation. Further, as compared with the case where the image targeted for processing 51 is scanned on the basis of the individual pixels within the targeted for processing 51, judgment is made by performing scanning in consideration of the relationship between adjacent pixels. As a result, the judgment accuracy can be enhanced.

Through the above-descried judgment process, when the image judging section 12 judges that the specific image part 53 is included in the image targeted for processing 51, as shown in FIG. 4B, the potential target image portion 55 including a circular arc defining the specific image part 53 is created. At this time, the potential target image portion 55 assumes a circular shape.

Figure 6A:
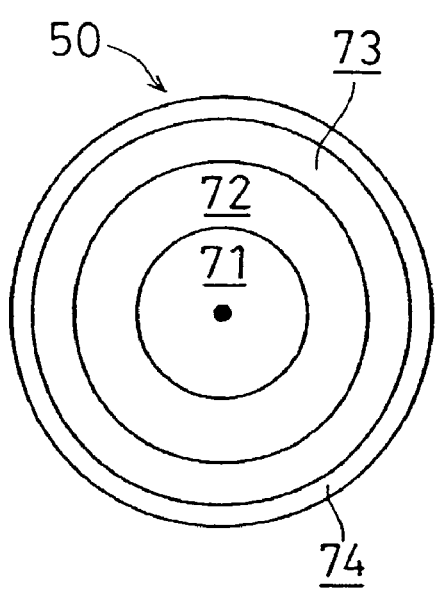
FIGS. 6A and 6B are plan views showing the target image portion divided into a plurality of regions.

FIG. 6 is a plan view showing the target image portion 50 divided into a plurality of regions. When it is judged that the specific image part 53 is included in the image targeted for processing 51, the image confirming section 13 checks whether or not the potential target image portion 55 including the specific image part 53 is equal to the target image portion 50. As shown in FIG. 6A, the target image portion 50 is divided into four regions: a first divided region 71; a second divided region 72; a third divided region 73; and a fourth divided region 74, by circumferences of three different-size circles having their centers at a common position, i.e. the center of the circle representing the target image portion 50. As listed in Table 1, the storage section 14 of the image processing apparatus 10 stores the range of the number of black pixels included in each of the divided regions 71 to 74.

TABLE 2

| | Range of pixel number |
|---|---|
| First divided region 71 | $280 \leqq black \leqq 320$ |
| Second divided region 72 | $290 \leqq black \leqq 330$ |
| Third divided region 73 | $290 \leqq black \leqq 330$ |
| Fourth divided region 74 | $480 \leqq black$ |

In the image confirming section 13, the potential target image portion 55 is, alike to the target image portion 50 shown in FIG. 6A, divided into four regions: first through fourth divided regions by circumferences of three different-size circles having their centers at a common position, i.e. the center of the circle representing the potential target image portion 55. Then, judgment is made on whether or not the number of black pixels within the first divided region of the potential target image portion 55 falls within the range of black-pixel number set for the first divided region 71 of the target image portion 50 listed in Table 2. Similarly, the image confirming section 13 judges whether or not the number of black pixels within each of the second to fourth divided regions of the potential target image portion 55 respectively falls within the range of black-pixel number set for each of the second to fourth divided regions 72 to 74 of the target image portion 50 listed in Table 2. Through this process, when the numbers of black pixels within the first to fourth divided regions of the potential target image portion 55 are all judged to fall within their corresponding ranges of black-pixel number of the target image portion 50 listed in Table 2, the image confirming section confirms that the potential target image portion 55 is equal to the target image portion 50. In this way, the image processing apparatus 10 extracts the target image portion 50 from the image targeted for processing 51.

Figure 6B:
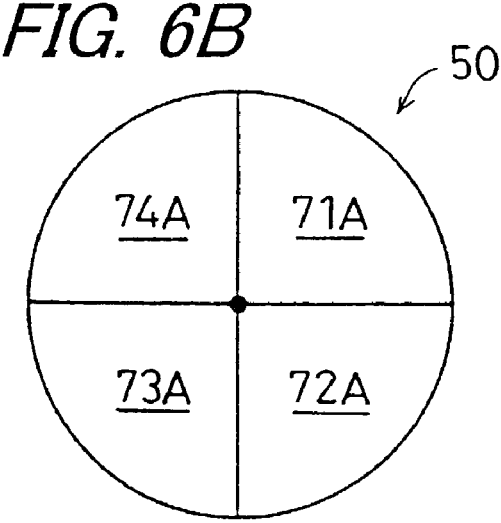

Alternatively, as shown in FIG. 6B, the target image portion 50 may be divided into four regions: a first divided region 71A; a second divided region 72A; a third divided region 73A; and a fourth divided region 74A, by two line segments intersecting at the center of the circle representing the target image portion 50, in such a way that the numbers of black pixels of the individual divided regions are averaged, namely, are set to be substantially the same. In this case, the range of black-pixel number for each of the divided regions 71A to 74A is set as listed in Table 3.

TABLE 3

| | Range of pixel number |
|---|---|
| First divided region 71A | 280 ≦ black ≦ 320 |
| Second divided region 72A | 280 ≦ black ≦ 320 |
| Third divided region 73A | 280 ≦ black ≦ 320 |
| Fourth divided region 74A | 280 ≦ black ≦ 320 |

As described above, by averaging the ranges of black-pixel number in the individual divided regions 71A to 74A of the target image portion 50, it is possible to eliminate the need to store at least one range of black-pixel number, or equivalently, the need to store the range of black-pixel number on a region-by-region basis. Thus, as compared with the case where the number of pixels is stored on a region-by-region basis, the storage capacity for storing the number of pixels in each divided region can be reduced.

According to the image processing apparatus 10 exemplified by the embodiment, the image judging section 12 judges whether or not the target image portion 50 is included in the image targeted for processing 51 by judging whether or not the specific image part 53 is included in the image targeted for processing 51. Such a judgment process requires less information than the case where whether or not the target image portion 50 is included in the image targeted for processing 51 is judged on the basis of the entire target image portion 50. Thus, judgment on the possibility that the target image portion 50 may be included in the image targeted for processing 51 can be made swiftly. Moreover, because of the fewness of the information required, the circuit configuration for performing such a judgment operation can be simplified, and also the capacity of the storage section 14 for storing information can be reduced.

Further, when the image judging section 12 judges that the specific image part 53 is included in the image targeted for processing 51, whether or not the potential target image portion 55 including the specific image part 53 is equal to the target image portion 50 is checked. This allows the image processing apparatus 10 to extract the target image portion 50 with high accuracy.

In the image processing apparatus 10 of the embodiment, the target image portion 50 refers to a seal represented as a circled kanji character "㊙" as shown in FIG. 4A. However, the target image portion is not limited thereto, but may be of an image described hereinbelow.

FIGS. 7A through 7D are plan views showing a square-shaped target image portion 80 and a square-shaped potential target image portion 85. In the square-shaped target image portion 80, a specific image part 53A is a substantially U-shaped image consisting of one side of the target image portion 80; part of another side continuous with said one side; and part of still another side continuous with said one side. The image judging section 12 employs a template 54A (refer to FIG. 7A) having a pixel group representing such a specific image part 53A, and a judging window 56A (refer to FIG. 7B) having a pixel group whose arrangement is substantially the same as in the template 54A. In the image judging section 12, by scanning the image targeted for processing 51 using the judging window 56A, whether or not the specific image part 53A is included in the image targeted for processing 51 is judged.

Figure 7A:
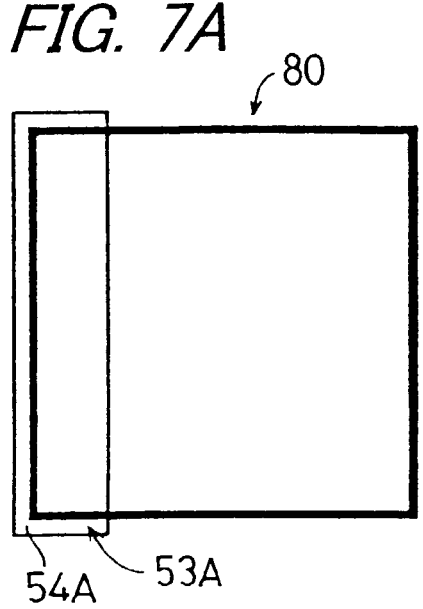
FIGS. 7A through 7D are plan views showing a target image portion and a potential target image portion, both of which have a square shape.
Figure 7B:
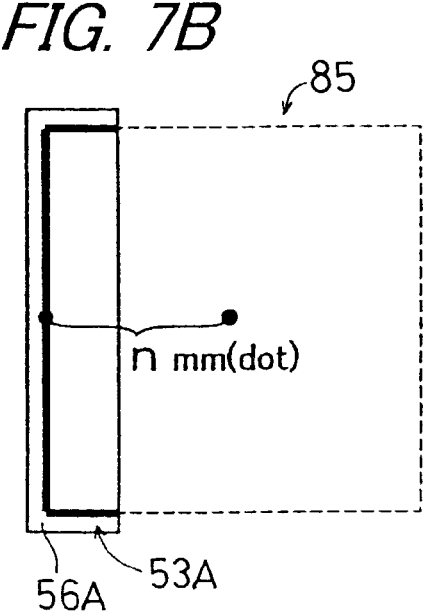
Figure 7C:
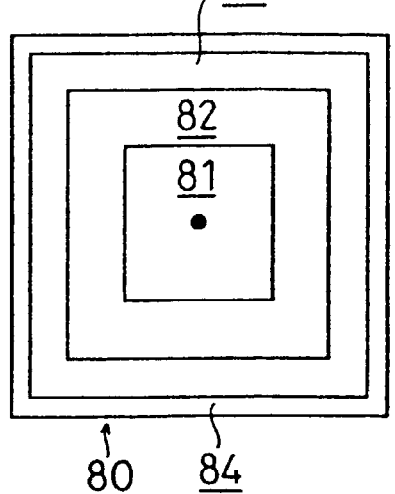

As shown in FIG. 7C, the target image portion 80 is divided into four regions: a first divided region 81; a second divided region 82; a third divided region 83; and a fourth divided region 84, by four-side perimeters of three squares having their centers at a common position, i.e. the center of the square representing the target image portion 80. For each of the divided regions 81 to 84, the number of black pixels is set in a predetermined range, and the resultant data on the pixel number is stored in the storage section 14 of the image processing apparatus 10.

Figure 7D:
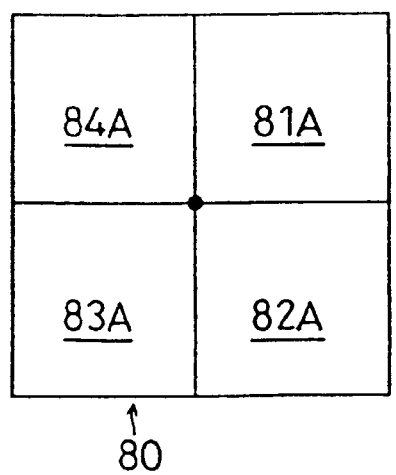

Alternatively, as shown in FIG. 7D, the target image portion 80 may be divided into four regions: a first divided region 81A; a second divided region 82A; a third divided region 83A; and a fourth divided region 84A, by two line segments: a line parallel to the one side of the target image portion 80; and a line perpendicular to the one side that intersect at the center of the target image portion 80.

FIGS. 8A through 8D are plan views showing a target image portion 90 and a potential target image portion 95, both of which have an isosceles right triangle shape. In the target image portion 90 of isosceles right triangle shape, a specific image part 53B is a substantially L-shaped image consisting of part of the target image portion 90 including two perpendicular sides thereof. The image judging section 12 employs a template 54B (refer to FIG. 8A) having a pixel group representing such a specific image part 53B, and a judging window 56B (refer to FIG. 8B) having a pixel group whose arrangement is substantially the same as in the template 54B. In the image judging section 12, by scanning the image targeted for processing 51 using the judging window 56B, whether or not the specific image part 53B is included in the image targeted for processing 51 is judged.

Figure 8A:
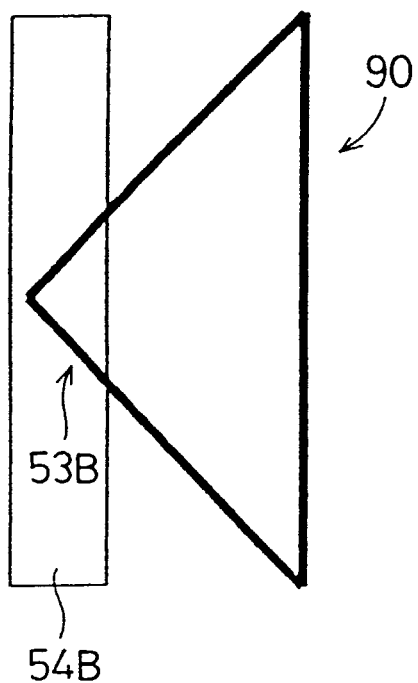
FIGS. 8A through 8D are plan views showing a target image portion and a potential target image portion, both of which have an isosceles right triangle shape.
Figure 8B:
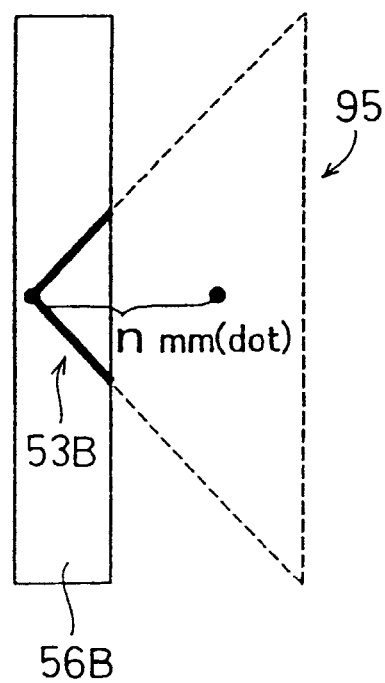
Figure 8C:
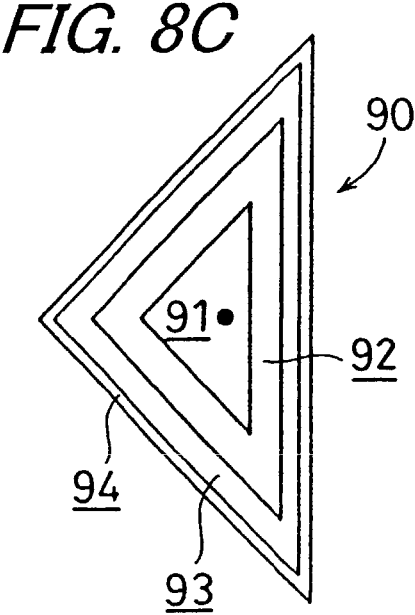

As shown in FIG. 8C, the target image portion 90 is divided into four regions: a first divided region 91; a second divided region 92; a third divided region 93; and a fourth divided region 94, by three-side perimeters of three isosceles right triangles having their centers at a common position, i.e. the center of the isosceles right triangle representing the target image portion 90. For each of the divided regions 91 to 94, the number of black pixels is set in a predetermined range, and the resultant data on the pixel number is stored in the storage section 14 of the image processing apparatus 10.

Figure 8D:
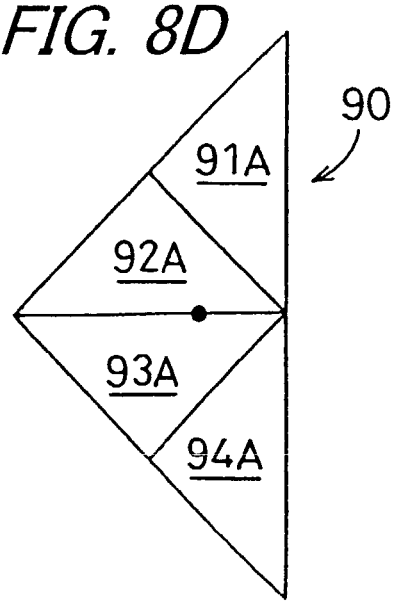

Alternatively, as shown in FIG. 8D, the target image portion 90 may be divided into four regions: a first divided region 91A; a second divided region 92A; a third divided region 93A; and a fourth divided region 94A, each of which is shaped like an isosceles right triangle having a longer side whose dimension is half that of the longer side of the target image portion 90.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus for extracting a to-be-extracted target image portion included in an image targeted for processing, comprising:

judging means for judging whether or not a specific image part belonging to the target image portion is included in the image targeted for processing, and for creating a potential target image portion including the specific image part when the specific image part is judged to be included in the image targeted for processing; and confirming means for determining whether or not a potential target image portion including the specific image part is equal to the target image portion wherein the judging means judges whether or not the specific image part is included in the image targeted for processing by comparing a number of pixels of a single specific color within part of the image targeted for processing with a number of pixels of a single specific color within the specific image part, and wherein the confirming means determines whether or not a potential target image portion is equal to the target image portion by, after the potential target image portion included in the image targeted for processing and the target image portion are respectively divided into a plurality of regions, comparing a number of pixels of a single specific color within each region of the potential target image portion with a number of pixels of a single specific color within each region of the target image portion.

2. The image processing apparatus of claim 1, wherein the confirming means determines whether or not a potential target image portion is equal to the target image portion by, after the potential target image portion included in the image targeted for processing and the target image portion are respectively divided into a plurality of regions, comparing a number of pixels of a single specific color within each region of the potential target image portion with a number of pixels of a single specific color within each region of the target image portion.

3. The image processing apparatus of claim 1, wherein the target image portion is divided in such a way that the numbers of pixels of a single specific color within the divided regions are averaged.

4. The image processing apparatus of claim 2, wherein the target image portion is divided in such a way that the numbers of pixels of a single specific color within the divided regions are averaged.

5. The image processing apparatus of claim 1, wherein the judging means employs a template for representing the specific image part based on information on each pixel constituting a pixel group, the pixel group being obtained by arranging two or more pixel lines, each of which consists of an array of a plurality of pixels arranged in a predetermined first direction, in a second direction perpendicular to the first direction, and wherein the judging means judges whether or not the specific image part is included in the image targeted for processing by scanning the image targeted for processing using a judging window having a pixel group whose arrangement is substantially the same as in the template, followed by, after dividing each pixel line into a plurality of regions, comparing a number of pixels of a single specific color within each of the regions of the judging window with a number of pixels within each of the regions of the template.

6. The image processing apparatus of claim 5, wherein the judging means judges that the specific image part is included in the image targeted for processing when the number of pixels of a single specific color within each divided region of the pixel line is found to fall within a predetermined range.

7. The image processing apparatus of claim 1, wherein the apparatus is mounted in an image forming apparatus, further comprising:

a pre-processing means for converting information for use in image formation into low-volume information for use in image extraction.

* * * * *